(12) United States Patent
Singh et al.

(10) Patent No.: US 10,956,658 B2
(45) Date of Patent: Mar. 23, 2021

(54) DIGITAL CONTENT EDITING OF A DOCUMENT OBJECT MODEL (DOM) BASED ON OBJECT MODEL COMPARISON

(71) Applicant: Adobe Inc., San Jose, CA (US)

(72) Inventors: Harpreet Singh, Chandigarh (IN); Vaibhav Nigam, Kanpur (IN); Sachin Jain, West Ghonda (IN)

(73) Assignee: Adobe Inc., San Jose, CA (US)

( * ) Notice: Subject to any disclaimer, the term of this patent is extended or adjusted under 35 U.S.C. 154(b) by 30 days.

(21) Appl. No.: 16/014,918

(22) Filed: Jun. 21, 2018

(65) Prior Publication Data

US 2019/0392024 A1 Dec. 26, 2019

(51) Int. Cl.
 *G06F 40/14* (2020.01)
 *G06F 40/194* (2020.01)

(52) U.S. Cl.
 CPC ............ *G06F 40/14* (2020.01); *G06F 40/194* (2020.01)

(58) Field of Classification Search
 CPC ............................... G06F 40/14; G06F 40/194
 USPC .................................................. 715/234, 255
 See application file for complete search history.

(56) References Cited

U.S. PATENT DOCUMENTS

| | | | |
|---|---|---|---|
| 6,260,042 B1 * | 7/2001 | Curbera | G06F 40/194 |
| 6,829,746 B1 * | 12/2004 | Schwerdtfeger | G06F 17/2247 |
| | | | 715/239 |
| 6,920,609 B1 * | 7/2005 | Manber | G06F 16/951 |
| | | | 715/205 |
| 7,475,339 B2 * | 1/2009 | Holloway | G06Q 10/10 |
| | | | 715/234 |
| 8,151,279 B1 * | 4/2012 | Grabowski | G06F 3/0488 |
| | | | 719/318 |
| 8,248,428 B2 * | 8/2012 | Kowalski | G06T 11/60 |
| | | | 345/581 |
| 8,458,584 B1 * | 6/2013 | Wilson | G06F 16/951 |
| | | | 715/234 |
| 9,087,142 B2 * | 7/2015 | Barkol | G06F 16/185 |
| 9,325,734 B1 * | 4/2016 | Peacock | G06F 40/14 |
| 9,582,600 B1 * | 2/2017 | Killian | G06F 40/154 |
| 2002/0184265 A1 * | 12/2002 | Gupta | G06F 40/10 |
| | | | 715/236 |
| 2004/0249979 A1 * | 12/2004 | Yamaguchi | H04N 1/00291 |
| | | | 709/246 |

(Continued)

OTHER PUBLICATIONS

Bertino et al.; A matching algorithm for measuring the structural similarity between an XML document and a DTD and its applications; 2003; Elsevier Science; pp. 23-46.*

*Primary Examiner* — Andrew R Dyer
(74) *Attorney, Agent, or Firm* — FIG. 1 Patents

(57) ABSTRACT

Digital content editing techniques are described that support edits to a document object model (DOM) of a digital document. In one example, a user input is received by a system to edit a first document object model (DOM) and thereby create a second DOM, e.g., to change a name of a tag, a name of an attribute, a value of an attribute, and/or digital content specified by the DOM. The system then compares tree structures of the first and second DOMs to each other in order to identify content editing operations that, when applied to the first DOM, cause the first DOM to match the second DOM, e.g., have matching tree structures and attributes. The identified content editing operations are then used to update the digital document by including these operations as stored along with the first DOM.

20 Claims, 11 Drawing Sheets

(56) References Cited

U.S. PATENT DOCUMENTS

| | | | | |
|---|---|---|---|---|
| 2005/0038785 A1* | 2/2005 | Agrawal | | G06F 40/14 |
| 2007/0150556 A1* | 6/2007 | Fukuda | | G06F 16/958 |
| | | | | 709/219 |
| 2007/0234201 A1* | 10/2007 | Fukura | | G06F 40/14 |
| | | | | 715/234 |
| 2008/0109784 A1* | 5/2008 | Levine | | G06F 40/14 |
| | | | | 717/106 |
| 2008/0281834 A1* | 11/2008 | Wu | | G06F 16/95 |
| 2009/0063500 A1* | 3/2009 | Zhai | | G06F 16/81 |
| 2009/0070392 A1* | 3/2009 | Le Roy | | G06F 16/958 |
| 2010/0313149 A1* | 12/2010 | Zhang | | G06F 16/972 |
| | | | | 715/760 |
| 2011/0016359 A1* | 1/2011 | Kawanaka | | G06F 16/957 |
| | | | | 714/38.1 |
| 2011/0258538 A1* | 10/2011 | Liu | | G06F 40/166 |
| | | | | 715/256 |
| 2011/0320880 A1* | 12/2011 | Wenig | | G06F 11/3476 |
| | | | | 714/39 |
| 2012/0143947 A1* | 6/2012 | Kikuchi | | G06Q 30/02 |
| | | | | 709/203 |
| 2014/0123000 A1* | 5/2014 | Decker | | G06F 17/2247 |
| | | | | 715/234 |
| 2014/0237296 A1* | 8/2014 | Shanahan | | G06F 11/3624 |
| | | | | 714/38.14 |
| 2014/0237350 A1* | 8/2014 | Ryall | | H04L 65/403 |
| | | | | 715/234 |
| 2015/0161087 A1* | 6/2015 | Khoo | | G06F 16/957 |
| | | | | 715/234 |
| 2015/0227566 A1* | 8/2015 | Tanaka | | G06F 16/9577 |
| | | | | 707/722 |
| 2015/0242380 A1* | 8/2015 | Guo | | G06F 11/3672 |
| | | | | 715/237 |
| 2016/0070813 A1* | 3/2016 | Unter Ecker | | G06F 16/958 |
| | | | | 715/234 |
| 2016/0170953 A1* | 6/2016 | Maddali | | G06F 16/986 |
| | | | | 715/234 |
| 2017/0163690 A1* | 6/2017 | Graham | | G06F 40/14 |
| 2017/0178234 A1* | 6/2017 | Jezek, Jr. | | G06Q 40/04 |
| 2017/0277437 A1* | 9/2017 | Jones | | G06F 16/178 |
| 2018/0011678 A1* | 1/2018 | Shipper | | G06F 3/0482 |
| 2018/0089054 A1* | 3/2018 | Shershevsky | | G06F 17/2211 |
| 2018/0191764 A1* | 7/2018 | Chawla | | H04L 63/1433 |

\* cited by examiner

```
1  <p style="display: block;">
2  When you switch to select Rogers 3 product bundles on a 1 year term<sup>8</sup>
3  </p>
4  <div class="btn btn-default btn-cta">
5    <a href="tel:18668281603">
6      Call 1 866 828-1603 now to order
7    </a>
8  </div>
```
706

```
1  <p style="display: block;">
2  When you switch to select Rogers 3 product bundles on a 1 year term<sup>8</sup>
3  </p>
4  <div class="btn btn-default btn-cta">
5    <a href="tel:18006537633">
6      Call 1-800-653-7633 now to order
7    </a>
8  </div>
```
708

| Content Length | | | | |
|---|---|---|---|---|
| S. No | Conventional | New Solution | change | % reduction |
| 1 | 228 | 139 | 89 | ~40% |
| 2 | 296 | 41 | 255 | ~86% |
| 3 | 333 | 111 | 222 | ~67% |
| 4 | 662 | 170 | 492 | ~74% |
| 5 | 1817 | 585 | 1232 | ~68% |
| 6 | 1459 | 724 | 735 | ~50% |
| 7 | 659 | 340 | 319 | ~48% |
| 8 | 2989 | 1509 | 1480 | ~50% |
| 9 | 3319 | 1576 | 1743 | ~53% |
| 10 | 8449 | 1942 | 6507 | ~77% |
| 11 | 31722 | 1575 | 30147 | ~95% |
| 12 | 56160 | 173 | 55987 | ~99.99% |
| 13 | 98172 | 477 | 97695 | ~99.99% |
| 14 | 123711 | 524 | 123187 | ~99.99% |
| 15 | 113599 | 18230 | 95369 | ~84% |

```
<div class="a-column a-span6 leftCol">
   <div class="imageWithText">
      <a class="a-link-normal" href=
      "/b/ref=br_pdt_mgUpt/260-7410204-9984706?_encoding=UTF8&a
      mp;node=976419031&pf_rd_m=A1VBAL9TL5WCBF&pf_rd_s=
      &pf_rd_r=433K4Z5AS2E18A0VPFGZ&pf_rd_t=36701&p
      f_rd_p=8a03694f-62f3-426b-8b7a-2fc5d5a00b3d&pf_rd_i=d
      esktop"><img alt="Electronics_2" src=
      "https://images-eu.ssl-images-amazon.com/images/G/31/img1
      6/Gateway/292x292_electronics_2._CB536127208_.png"
      height="292px" width="292px"></a>
      <div class="deparmentTitle">            1006
         <span class="a-size-base">
            Electronics
         </span>           1008
      </div>
   </div>
</div>
```

1004

```
<div class="a-column a-span6 leftCol">
   <div class="imageWithText">
      <a class="a-link-normal" href=
      "/b/ref=br_pdt_mgUpt/260-7410204-9984706?_encoding=UTF8&
      amp;node=976419031&pf_rd_m=A1VBAL9TL5WCBF&pf_rd_
      s=&pf_rd_r=433K4Z5AS2E18A0VPFGZ&pf_rd_t=36701&am
      p;pf_rd_p=8a03694f-62f3-426b-8b7a-2fc5d5a00b3d&pf_rd
      _i=desktop"><img alt="Electronics_2" src="
      https://images-eu.ssl-images-amazon.com/images/G/31/img1
      6/Gateway/292x292_gadgets_2._CB536127208_.png" height=
      "292px" width="292px"></a>
      <div class="departmentTitle">
         <span class="a-size-base">        1010
            Gadgets
         </span>           1012
      </div>
   </div>
</div>
```

Fig. 10

DIGITAL CONTENT EDITING OF A DOCUMENT OBJECT MODEL (DOM) BASED ON OBJECT MODEL COMPARISON

BACKGROUND

Dynamic digital documents are utilized by service provider systems to implement personalized experiences for a multitude of client devices, e.g., as webpages, user interfaces as part of a mobile application, and so on that may be delivered via a network to thousands and even millions of client devices. In one example, a set of business rules is specified to support dynamic personalization records to control which items of digital content are to be provided to respective users within the digital document. To do so, a document object model (DOM) is typically employed to specify configuration of digital content within portions of the digital document through DOM manipulation actions, such as to specify particular items of digital content, attributes of the digital content, styles such as height and width, and so on.

In some scenarios, service provider systems support content personalization editors that include a what-you-see-is-what-you-get (WYSIWYG) user interface, via which, a marketer or other user may specify edits to the DOM, e.g., as HTML actions. These edits may be used to specify changes to a configuration of the digital document that is delivered to respective client devices. Conventional techniques to do so, however, face a variety of challenges. In one such challenge, digital content that is changed within a container within a digital document (e.g., an image as part of a webpage) is recorded at a time of making the edit. This causes conventional service provider systems to replace a previous version of the digital content within the container with an updated version of digital content having the change. The updated version is then transmitted over a network at runtime of the digital content to replace the previous version at a client device. Therefore, even if the actual change is small, digital content delivered over the network at runtime as a result of the change may be quite large, which adds to latency and inefficient use of computational and network resources.

The specified edits, for instance, are recorded "as is" by the system. Therefore, even though the marketer may specify relatively small edits to a section of a webpage, like a change in an attribute (e.g., hyperlink of an anchor tag), the size of the digital content within the container that corresponds to this change may be quite large (e.g., 253 KB). Accordingly, replacement of digital content included in the container with another item of digital content (e.g., different ads), especially at run time, results in an inefficient use of computational and network resources. Further, in some instances of digital content replacement, functional side effects may be encountered due to unintended loss of event handlers due to replacement of the digital content. This may cause execution of the overall digital document to fail, thereby also hindering operation of the computing device.

Conventional digital content editing techniques of a document object model (DOM) may also result in a diminished user experience at the client device. With conventional techniques, because the digital content is delivered as part of the digital document (e.g., sections of a webpage), a user of the client device may notice a flicker in a user interface when rendering the digital document due to a lag in applying actions specified by the DOM. Conventional techniques to avoid this flicker involve pre-hiding default digital content within a respective container using cascading style sheet (CSS) rules. However, because the digital content may be quite large as specified above, a large subsection of the digital document that corresponds to the container may remain hidden for a noticeable period of time, and thus contribute to a diminished user experience.

SUMMARY

Digital content editing techniques are described that support edits to a document object model (DOM) of a digital document. These techniques overcome the challenges of conventional systems and as a result improve network and computational efficiency of computing devices. In one example, a user input is received by a system to edit a first document object model (DOM), e.g., to change a name of a tag, a name of an attribute, a value of an attribute, and/or digital content specified by the DOM. The edit causes the system to create a second document object model (DOM) from the first DOM. The system then compares tree structures of the first and second DOMs to each other in order to identify content editing operations that, when applied to the first DOM, cause the first DOM to match the second DOM, e.g., have matching tree structures and attributes. The identified content editing operations are then used to update the digital document by including these operations as stored along with the first DOM, rather than replacing the first DOM with the second DOM. As a result, the content editing operations may be used for delivering personalized digital content with increased efficiency through communication of the content editing operations and not replacement of an entirety of digital content in a container that corresponds to the edit as required in conventional techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 7 depicts an example of a change HTML action specified via user input to a respective node of a DOM.

FIG. 8 depicts an example table comparing operation of the techniques described herein with conventional techniques.

FIG. 10 depicts an example implementation of the user interface of FIG. 2 as tracking edits to a markup language of a DOM.

DETAILED DESCRIPTION

Overview

Figure 1:
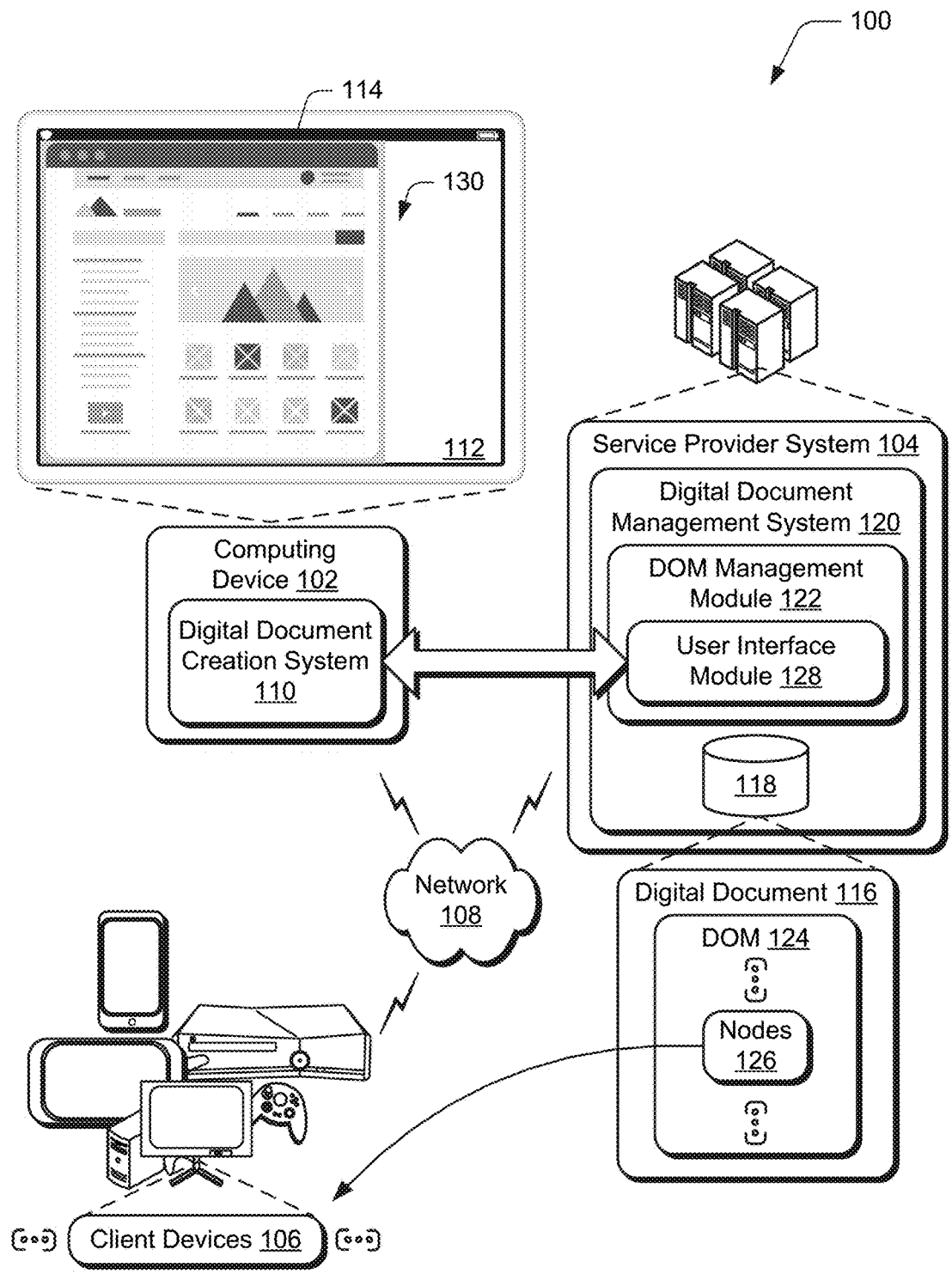
FIG. 1 is an illustration of an environment in an example implementation that is operable to employ digital content editing techniques of a document object model (DOM) described herein.

Document object models (DOMs) are employed by a wide range of service provider systems to support personalized output of a digital document. For example, a web service provider may configure a digital document as a webpage for personalized output of digital marketing content (e.g., advertisements) to thousands and even millions of client devices. The web service provider may also support an ability to edit the DOM in order to make changes to how the digital document is personalized for particular client devices. However, conventional techniques to do so as previously described result in an inefficient use of computational and network resources, a diminished user experience (e.g., "flicker" as caused by replacement of digital content within the digital document), functional anomalies caused by loss of event handlers, and so on.

Accordingly, techniques and systems are described herein that support digital content editing of a document object model (DOM) of a digital document that overcome these conventional challenges. As such, these techniques and systems improve network and computational efficiency of computing devices that provide digital documents to thousands and even millions of client devices, avoids functional anomalies that may occur due to replacement of digital content as in conventional techniques, as well as an improved user experience at each of these client devices.

In one example, a digital document management system receives a user input to edit a first document object model (DOM). As previously described, the first document object model (DOM) is used to specify configuration of digital content within portions of the digital document (e.g., at respective nodes) through DOM manipulation actions. This may be used to specify particular items of digital content to be included at respective nodes, attributes of the digital content, styles such as height and width, and so on. Accordingly, the user input received to edit the DOM may include a variety of actions, including changing a name of a tag, a name of an attribute, a value of an attribute, and/or digital content specified by the DOM. The user input, for instance, may be received via a WYSIWYG user interface that includes a rendered version of the digital document that support user interaction to specify an edit. The user input may specify replacement of digital images, a change in size to text, and so forth through interaction with the rendered digital content within the user interface that is included within the digital document. In another instance, the user input is specified through interaction with a markup language of the DOM, directly, e.g., through editing text of a markup language of the DOM.

These edits cause the digital document management system to create a second document object model (DOM) from the first DOM. The digital document management system then compares tree structures of the first and second DOMs to each other in order to identify content editing operations that, when applied to the first DOM, cause the first DOM to match the second DOM, e.g., have matching tree structures and attributes. To do so, the digital document management system employs a technique similar to an "Edit Distance" approach in which a first string is transformed into a second string using a minimal set of operations.

In one such example, the digital document management system first serializes tree structures of the first and second DOMs, which are stored as an array of references to nodes contained within respective tree structures. A function is then defined by the digital document management system that includes a minimum number of content editing operations usable to transform the first DOM into the second DOM. This function is also used to track which content editing operations that are used to do so. The content editing operations, for instance, may include edits to a tag name, edits to an attribute, removal of an attribute, insertion of a node (e.g., before or after another node) into the tree structure of the DOM, deletion of a node from the tree structure of the DOM, an edit to digital content specified by a respective node, and so forth. As a result, the digital document management system identifies a minimum set of content editing operations usable to transform the first DOM into the second DOM.

The identified content editing operations are then used by the digital document management system to update the digital document by including these operations as associated with the first DOM. As a result, the content editing operations may be used for delivering personalized digital content as part of the digital document by applying the operations instead of replacing an entirety of the digital content within a respective container in the DOM as required using conventional techniques. In practice, this optimization has been observed to reduce network consumption in making edits to the digital document at runtime between forty to ninety percent when compared with conventional techniques.

Also, at the time of client-side delivery, items of digital content that are relevant to the edit in the digital document are hidden, which avoids flicker in a user interface at a client device caused by conventional techniques which involve hiding an entirety of the digital content within a container of the digital document. This supports an improved user experience because hiding a complete container as required in conventional techniques may lead to a significant amount of white space in a digital document (e.g., webpage) which may be viewable for a considerable period of time and give an appearance of lag. Further discussion of these and other examples is included in the following sections and shown in corresponding figures.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital content editing techniques of a document object model (DOM) described herein. The illustrated environment 100 includes a computing device 102, a service provider system 104, and a plurality of client devices (an example of which is illustrated as client device 106) that are communicatively coupled, one to another, via a network 108. Computing devices that implement the computing device 102, service provider system 104, and client device 106 may be implemented in a variety of ways.

A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is described in instances in the following discussion, reference to a computing device may be representative of a plurality of different devices, such as multiple servers utilized by a business to perform operations "over the cloud" as show for the service provider system 104 and as further described in relation to FIG. 11.

The illustrated digital medium environment 100 is configured to support digital document editing. The computing device 102, for instance, may include a digital document creation system 110 that is configured to process and transform a digital document. Such processing includes creation of a digital document, modification of the digital document, and rendering of the digital document in a user interface 112 for output, e.g., by a display device 114.

The computing device 102, for instance, may be utilized by a content creator to interact with a digital document creation system 110 create a digital document 116 (e.g., illustrated as stored in storage device 118) that is disseminated by the service provider system 104 to the client devices 106. The digital document 116, for instance, may be configured as a webpage that is transmitted to thousands and even millions of different client devices 106 via the network 108. Other examples of digital documents 116 are also contemplated, including individual screens of a user interface as part of a mobile application, parts of a digital book, and so forth.

To do so, the service provider system 104 includes a digital document management system 120 that supports user interaction with the digital document creation system 110 via the network 108 to create, edit, manage, and control dissemination of the digital document 116. To control personalization of the digital document 116 for each of the multitude of different client devices 106, the digital document management system 120 employs a document object model (DOM) management module 122.

The DOM management module 122 is configured to create and edit a document object model (DOM) 124 having a plurality of nodes 126. The DOM 124 includes a set of rules specified to support dynamic personalization records to control which items of digital content and attributes of the digital content are provided to respective client devices 106. To do so, the DOM 124 specifies configuration of digital content within respective portions of the digital document 116 (e.g., containers) through DOM manipulation actions, such as to specify particular items of digital content to display within a container, attributes of the digital content, styles such as height and width, and so on. Thus, the DOM 124 supports a cross-platform and language-independent application programming interface that support markup languages such as HTML, XML, and XHTML as a hierarchical tree structure in which each node 126 is an object representing a part of the digital document 116, i.e., digital content included at respective portions of the digital document 116 when rendered in a user interface.

The DOM management module 122 also includes a user interface module 128 that is representative of functionality to support a content personalization editor through use of a "what-you-see-is-what-you-get" (WYSIWYG) user interface. Through interaction with the user interface 112 as output by the digital document creation system 110, a content creator (e.g., marketing profession) may specify edits to the DOM 124, e.g., as HTML actions.

Edits may be input in a variety of ways, such as through interaction with rendered versions of digital content 130 displayed in a user interface 112 to insert/remove/change digital content, attributes of the digital content, and so on. Edits may also be made through interaction with the user interface 112 to the DOM 124 directly, e.g., to change text of markup language at one or more nodes 126 of the digital document 116. These edits may be used to specify changes to a configuration of the digital document 116 that is delivered to respective client devices 106, and thus supports personalization to thousands and even millions of different client devices 106.

As previously described, conventional techniques used to support personalization of digital documents suffer from numerous challenges that result in inefficient use of computational and network resources as well as a diminished user experience. In conventional techniques, changes to digital content recorded at runtime within a container using conventional techniques result in communication of an entirety of the digital content within that container over a network. Accordingly, even if an actual change within the container is small, the digital content delivered over the network at runtime adds to latency, especially for mobile networks. Therefore, relatively small edits specified to a digital document (e.g., change in attribute such as a hyperlink of an anchor tag) may result in replacement of a significant amount of digital content within the document, which may consume significant amounts of network and computational resources. This may also result in a noticeable "flicker" in a user interface and thus diminish a user's experience in viewing the digital document. Conventional techniques to address this flicker may be viewed as a lag in rendering the digital document due to "pre-hiding" of digital content using cascading style sheet rules. Further, in some instances of conventional replacement of digital content within a digital document, event handlers are lost which has a functional impact on the execution of the digital document as a whole.

Accordingly, the DOM management module 122 described herein is configured to support improved techniques for authoring digital document 116 personalization by transforming content changes into content editing operations. This permits delivery of dynamic digital documents 116 to client devices 106 in an optimized and efficient manner. The content editing operations also support editing of the digital document 116 as well as the identified content editing operations in a WYSIWYG manner, e.g., showing each minute editing detail visually and reducing maintenance and editing overhead.

The DOM management module 122, for instance, may optimize payload content of a "set content" action, which is used to dynamically replace digital content on the digital document (e.g., HTML content on a webpage) at runtime. This is achieved by transforming and breaking edits to digital content to be replaced into content editing operations as refined actions. This has multiple advantages of reducing the overall network load, optimizing dynamic digital content replacement, and removing certain functional anomalies of the "set content" action as typically experienced when performed for items of digital content having a relatively large size, e.g., over 200 KB. Further discussion of these and other examples is included in the following section and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Content Editing of a Document Object Model (DOM)

Figure 2:
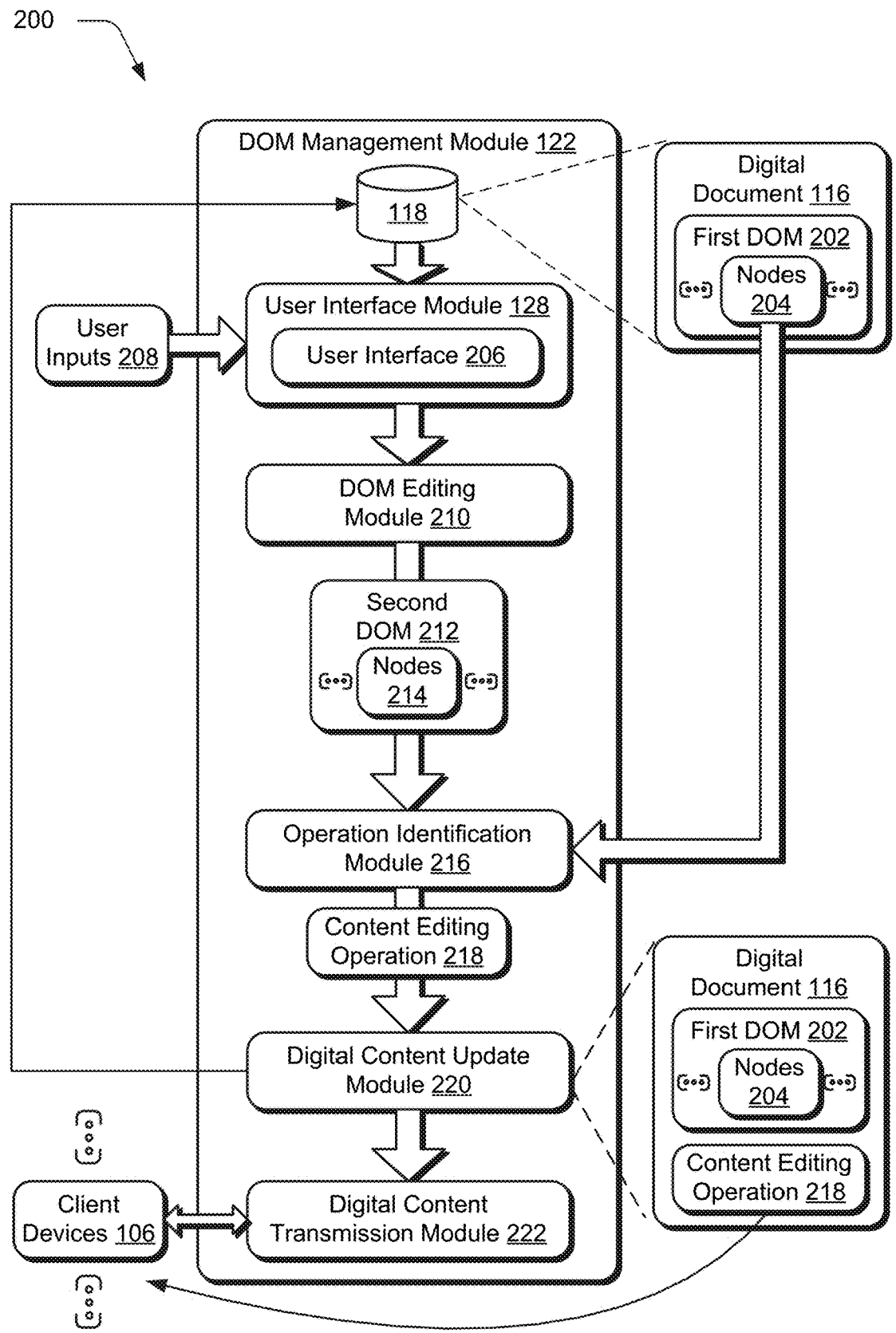
FIG. 2 depicts a system in an example implementation showing operation of a DOM management module of FIG. 2 in greater detail.
Figure 3:
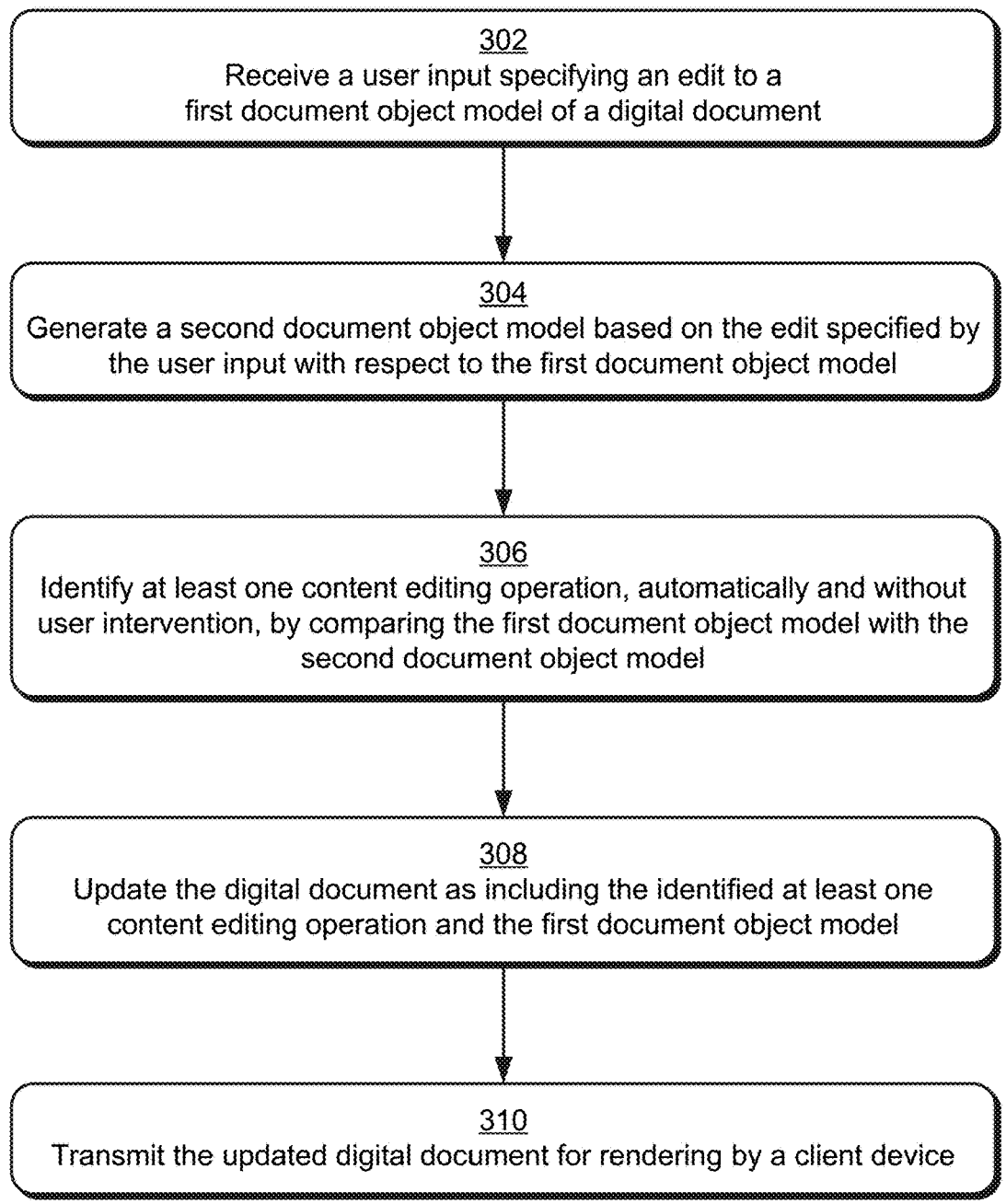
FIG. 3 is a flow diagram depicting a procedure in an example implementation that includes editing of a document object model (DOM) of a digital document.

FIG. 2 depicts a system 200 in an example implementation showing operation of the DOM management module 122 of FIG. 2 in greater detail. FIG. 3 depicts a procedure 300 involving editing of a document object model (DOM) of a digital document.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made interchangeably to FIGS. 2 and 3.

To begin, a user interface module 128 receives a digital document 116 having a first (i.e., current) DOM 202 including a plurality of nodes 204. The first document object model (DOM) 202 specifies configuration of digital content within portions of the digital document 116 at respective nodes 204 through DOM manipulation actions. This may be used to specify particular items of digital content to be included at respective nodes (e.g., through use of respective containers), attributes of the digital content, styles such as height and width, and so on.

Figure 4:
FIG. 4 depicts a first example of a user interface of FIG. 2 in which digital content specified by nodes of a first DOM of the digital document 116 are rendered for output.

User inputs 208 are then received that specify an edit to the first DOM 202 of the digital document 116 (block 302) via the user interface 206 of the user interface module 128. This may be performed in a variety of ways. FIG. 4 depicts a first example 400 of the user interface 206 in which digital content specified by nodes 204 of the first DOM 202 of the digital document 116 is rendered for output. The user interface 206 in this example supports WYSIWYG interaction, in which the user inputs 208 involve interaction with the rendered digital content to make the edits. This may include replacing digital content, rearranging of digital content, changes in attributes, values of attributes, and so forth during runtime of the digital document 116. The DOM editing module 210 may then make changes to respective nodes 204 of the first DOM 202, thereby generating a second document object model 212 having nodes 214 that are based on this change.

Figure 5:
FIG. 5 depicts another example of the user interface of FIG. 2 as including an underlying markup language (HTML) of nodes of the first DOM.
Figure 6:
FIG. 6 depicts an example in which text in the user interface of FIG. 5 is replaced.

In another example, the user inputs 208 include selection of an item of digital content 402 as illustrated, e.g., through use of a cursor control device, gesture, spoken utterance, and so forth. In response, a menu 502 is output as shown in an example 500 of the user interface 206 in FIG. 5 including an underlying markup language (HTML) of a respective node 204 of the first DOM 202. User interaction with the user interface 206 may then be used to make edits directly to the underlying markup language of the nodes 204 of the first DOM 202. In the illustrated example, the user inputs 208 select text "Electronics" 504 in a container, which is then replaced by the text "Gadgets" 602 in the menu 502 in the example 600 of FIG. 6. In this way, the DOM editing module 210 also supports changes to respective nodes 204 of the first DOM 202, thereby generating a second document object model (DOM) 212 having nodes 214 that are based on this change.

Returning again to FIG. 2, the first DOM 202 and the second DOM 212 are then passed to an operation identification module 216. The operation identification module 216 is configured to identify at least one content editing operation, automatically and without user intervention, by comparing the first DOM 202 with the second DOM 212 (block 306). The operation identification module 216, for instance, may be used optimize digital content replacement in a digital document (e.g., ads in a webpage) via a "set content" action through use of content editing operations 218. This technique is applicable for any client-side delivery engine that supports dynamically typed language actions (e.g., actions in JavaScript Object Notation (JSON)) received from a server to generate personalized digital content at nodes of the digital document 116.

For example, consider the following action JSON used to serve dynamic content:

```
{
"action": "setContent",
"Selector": "#buyBox > A:nth-of-type(1)",
"Content": "Buy Now"
}
```

Here the action key represents the type of action to be applied on a given element. The selector is a unique identifier for the given element on the page (example CSS/jQuery/Sizzle selector etc.). Content refers to a payload (i.e., the digital content) for the given action.

The operation identification module 216 is configured to generate content editing operations 218 through comparison of the first and second DOMs 202, 212. In one example, the inputs to the operation identification module 216 are the original markup language (e.g., HTML) of the first DOM 202 and the updated markup language (e.g., HTML) of the second DOM 212. The output is the content editing operation 218 as a set of actions that are usable to transform the markup language of the first DOM 202 to match the markup language of the second DOM 212. This technique is represented by the following function:

Processing function=generateOperations(input1, input2)
Inputs:
   Original HTML content=input1
   Final HTML content=input2
Output:
   Optimized set of actions=$\Sigma a(i)$
where
   generateOperations(input1, input2)=$\Sigma a(i)$ In one example, the operation identification module 216 employs a technique similar to an "Edit Distance" approach in which a first string is transformed into a second string using a minimal set of operations. To do so, the operation identification module 216 first serializes tree structures as specified by the markup languages of the respective first and second DOMs 202, 212 into an array of references to respective nodes 204, 214, which is stored. A function is then employed by the operation identification module 216 (e.g., "generateOperations(i, j)") to identify a minimum number of content editing operations 218 that are usable to transform the first DOM 202 into the second DOM 212, i.e., so the models "match." This function is also utilized by the operation identification module 216 to track which content editing operations 218 are used to achieve this transformation. As part of this, a suboptimal chain of content editing operations may be obtained by tracing back, and so a back pointer may also be stored in generateOperations (i, j) by the operation identification module 216.

A variety of edits may be specified by the user inputs 208 to generate the second DOM 212. Examples of such edits include the following:
1. Changing a DOM node type (e.g., a Tag Name)
2. Attribute Name
3. Attribute Value
4. Content Based on these edits, changes are made to the first DOM 202 to form the second DOM 212. The operation identification module 216 then compares the first and second DOMs 202, 212 to each other to determine content editing operations usable to cause the first DOM 202 to match the second DOM 212. Examples of content editing operations 218 that may be identified by the operation identification module 216 through comparison of the first and second DOMs 202, 212 to each other include the following:
1. Changing a DOM node type, such as by editing a tag name by changing <div>Hello</div> to <p>Hello</p>, which is renamed as 'Change DOM Node Type' OR 'Replace tag')
2. Edit Attribute
3. Remove Attribute
4. Insert Node (After/Before)
5. Delete Node
6. Edit Content Given the above set of content editing operations 218, the following table includes examples of how different edits used to generate the second DOM 212 are translated by the operation identification module 216 into respective content editing operations 218.

| Serial No | First DOM 202 | Second DOM 212 after User Edit | Operation(s) |
|---|---|---|---|
| 1 | <div class="container"> Hello World </div> | <div class="container" id="hw-container"> Hello World </div> | Edit Attribute |
| 2 | <div class="a">Hello</div> | <div class="b">Hi</div> | Edit Attribute Edit Content |
| 3 | <div class="a">Hi</div> | <p>Hello</p> | Replace Node |
| 4 | <div class="a">Hi</div> | <div class="a">Hi</div> <div class="b">Hey</div> | InsertAfter |
| 5 | <div class="a"> <span>$</span> <span>100</span> | <div class="a"> <span>$</span> <span>100</span> | RemoveNode |
| | <span>5$off</span> </div> | </div> | |

As shown in above examples, any edits to a tagName may be translated using an "EditTagName" content editing operation by the operation identification module 216. Likewise, edits to an attribute name or value of the attribute may be translated by the operation identification module 216 into edit/remove attribute content editing operations. Further, edits to the digital content itself may be addressed by the operation identification module 216 using Insert/Delete/Edit content editing operations 218.

FIG. 7 depicts an example 700 of change HTML action specified via user input 208 to a respective node of a DOM. The illustrated comparison shows original HTML content 702 of the first DOM 202 versus updated HTML content 704 of the second DOM 212 as part of defining a "set HTML" action. In this example, the user inputs 208 are used to test two variations of telephone numbers 706, 708 to be used for placing an order, e.g., at a webpage of a website.

In conventional techniques, the set content action is recorded as follows:

```
{
    "action": "setContent",
    "selector": "#content > DIV.column-container:eq(0)",
    "content": "<p style=\"display: block;\">When you switch to select Rogers 3 product bundles on a 1 year term<sup>8</sup></p>\n<div class=\"btn btn-default btn-cta\"><a href=\"tel:18006537633\">Call 1-800-653-7633 now to order</a></div>"
}
```

On the other hand, the digital content editing techniques described herein receive the first and second DOMs 202, 212 (e.g., original HTML content and updated HTML content) and transforms action content within these models into content editing operations 218 as refined actions. In this example, the operation identification module 216 breaks the action content into two separate actions, a first content editing operation to update an "href" attribute and a second content editing operation to modify text of anchor tag. As a result, the set content action is translated and stored by the operation identification module 216 as follows using content editing operations 218:

```
{
    "action": "setContent"
    "selector": "#content > DIV.column-container:eq(0)",
    "subactions": [{
        "action": "setContent",
        "selector": ".btn-cta a"
        "content": "Call 1-800-653-7633 now to order"
    }, {
        "action": "setAttribute",
        "selector": ".btn-cta a",
        "attribute": "href",
        "value": "tel:18006537633"
    }]
}
```

In this example, transformation of action content into content editing operations 218 results in a reduction of content length from 228 characters to 139 characters, i.e., a forty percent reduction. Also, edits specified to respective DOM elements are changed into content editing operations 218 as absolute sub-actions, thereby reducing overall maintainability requirements since the complete digital document specified by the second DOM 212 is not also stored. This increases user efficiency in subsequent editing of the digital document. FIG. 8 depicts an example table 800 showing that the techniques described herein have shown in practice to support a forty to ninety-nine percent reduction in content length of a "set content" change.

Figure 9:
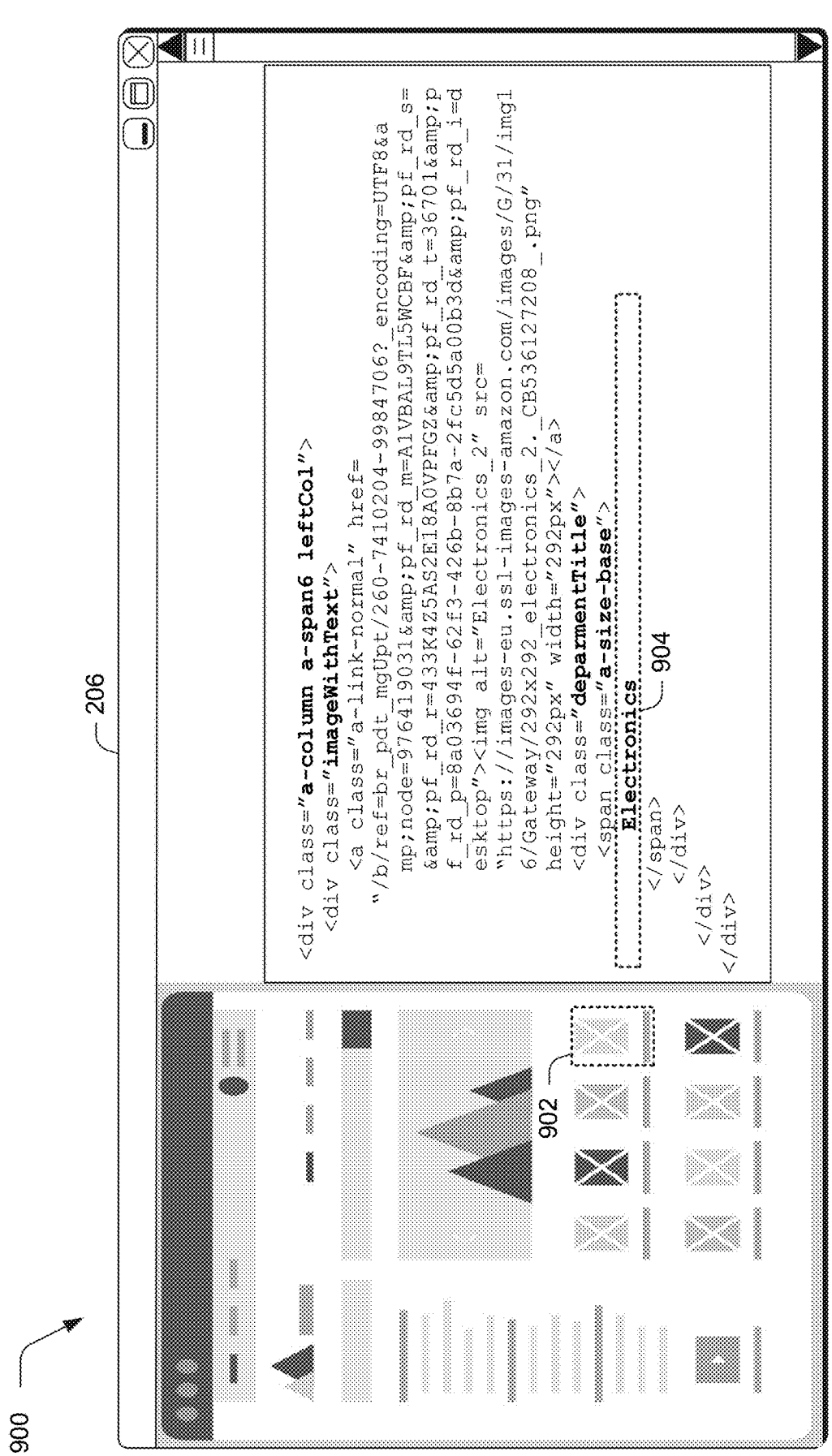
FIG. 9 depicts an example implementation of a user interface of FIG. 2 as supporting what you see is what you get (WYSIWYG) editing

FIG. 9 depicts an example implementation 900 of the user interface 206 of FIG. 2 as supporting what you see is what you get (WYSIWYG) editing. The digital content editing techniques described herein an intuitive way to visualize, compare and edit a digital document 116 having "set content" changes. In conventional techniques, a "set content" change is represented as a single action, even though multiple edits may be performed as part of the change. Accordingly, original and updated DOMS had to be compared, manually, in order to review and modify edits in conventional techniques.

As described above, however, a single "set content" action may be divided into a set of content editing operations 218 in a user interface 206 to visualize, compare, and edit each of the edits, individually. For example, the user interface 206 may support an expanded view in which selection of a rendered item of digital content 902 in the user interface causes output of a corresponding portion 904 of a markup language of the DOM. A user may then interact with the user interface 206 to further edit the markup language instead of replacing the whole content with a newer version and thus avoid multiple actions, e.g., "set HTML" actions. Further, these edits may be tracked in the markup language of the DOM, an example of which is described as follows.

FIG. 10 depicts an example implementation 1000 of the user interface 206 of FIG. 2 as tracking edits to a markup language of a DOM. This implementation 1000 is shown using first and second stages 1002, 1004. At the first stage 1002, first and second instances of the text "electronics" 1006, 1008 are selected and changed to gadgets 1010, 1012 as shown at the second stage 1004. The edits may be identified in the user interface by the digital content update module 220, e.g., through use of color coding. In this way, a user may be made aware as to which edits are made via a "set HMTL" action on a contained within the DOM at the time of editing in terms of attribute updates, text changes, and so on. This may be contrasted with conventional techniques in which the text is replaced without any indication that an edit has been made.

Example Function to Identify Content Editing Operations

The section includes an example of source code usable by the operation identification module 216 of the DOM management module 122 to support digital content editing of a document object model. As detailed above, a function "generateOperations" may be employed by the operation identification module 216 to compute set of content editing operations 218 usable to transform given HTML content of a first DOM 202 to updated HTML content of a second DOM 212. An example of the generateOperations" is described as follows:

```
function generateOperations(node1, node2) {
    var i,
        j,
        dom1 = [""].concat(serializeNode(node1)),
        dom2 = [""].concat(serializeNode(node2)),
    // Create an empty matrix of dom1.length x dom2.length
    result = createEmptyMatrix(dom1.length, dom2.length, { });
    // Fill base values
    for (i = 0; i < dom1.length; i++) {
        if (i == 0) {
            result[i][0] = { operations: [ ] };
        } else {
            result[i][0] = [ ].concat(result[i-1][0].operations);
            result[i][0].operations.push({
                action: 'removeElement',
                selector: getSelector(dom1[i])
            });
        }
    }
    for (j = 0; j < dom2.length; j++) {
        if (j == 0) {
            result[0][j] = { operations: [ ] };
        } else {
            result[0][j] = [ ].concat(result[0][j-1].operations);
            result[0][j].operations.push({
                action: 'insertElement',
                selector: getSelector(dom2[j])
            });
        }
    }
    // With the above base values, the result is then filled with operations
    for (i = 1; i < dom1.length; i++) {
        for (j = 1; j < dom2.length; j++) {
            var operations = getOperations(dom1[i], dom2[j]);
            // When elements are not similar
            if (operations === null) {
                if (result[i-1][j].operations.length < result[i][j-1].operations.length) {
                    result[i][j] = [ ].concat(result[i-1][j].operations);
                    result[i][j].operations.push({
                        action: 'removeElement',
                        selector: getSelector(dom1[i])
                    });
                } else {
                    result[i][j] = [ ].concat(result[i][j-1].operations);
                    result[i][j].operations.push({
                        action: 'insertElement',
                        selector: getSelector(dom2[j])
                    });
                }
            }
            // Elements match
            if (operations.length === 0) {
                result[i][j] = [ ].concat(result[i-1][j-1].operations);
            } else {
                result[i][j] = [ ].concat(result[i-1][j-1].operations);
                result[i][j].operations.push(operations);
            }
        }
    }
    return result[dom1.length-1][dom2.length-1].operations;
}
```

Example System and Device

Figure 11:
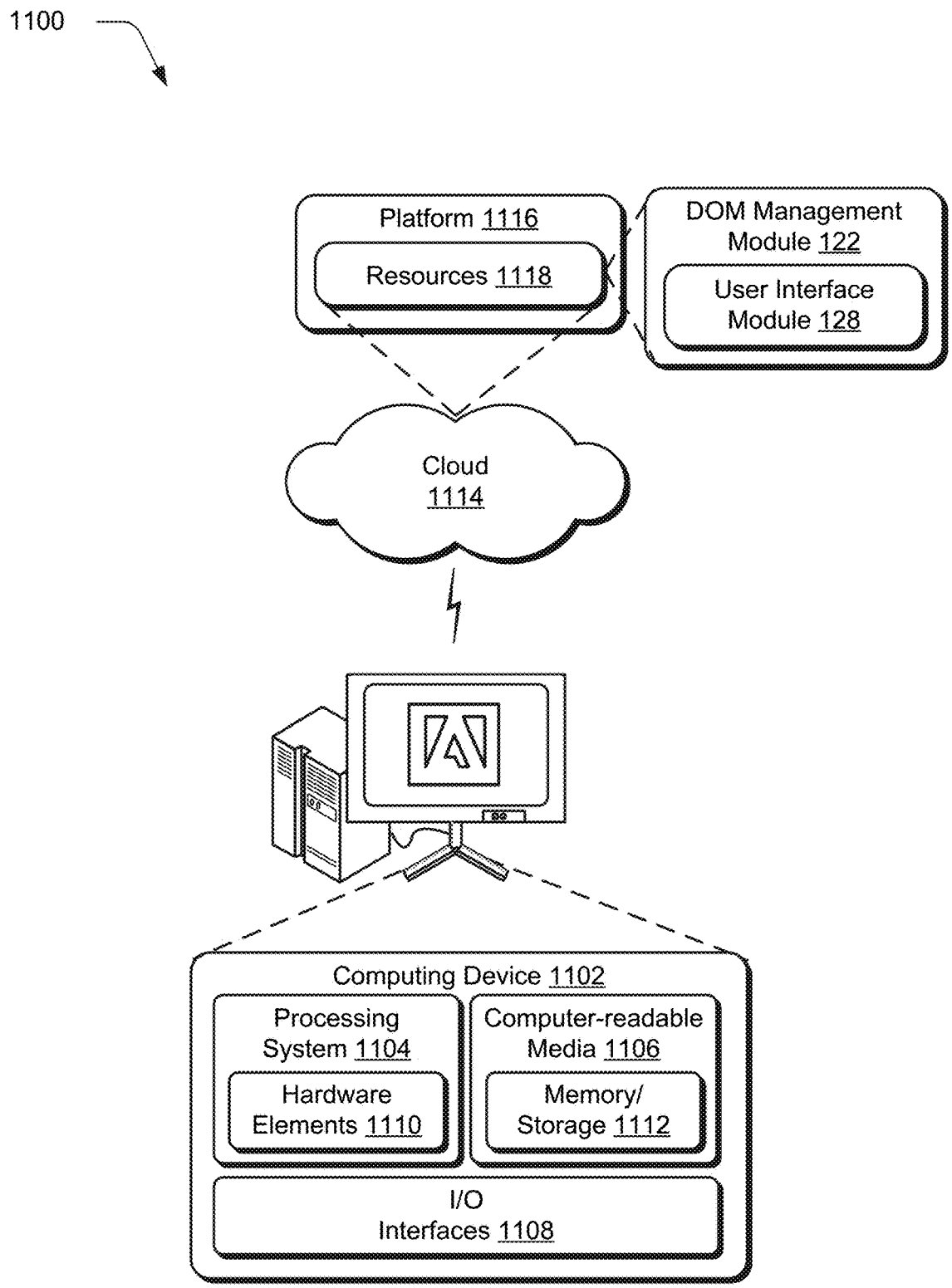
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the DOM management module 122 and user interface module 128. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium digital document editing environment, a method implemented by at least one computing device, the method comprising:
   receiving, by the at least one computing device, a user input specifying an edit to digital content, the digital content is specified by a node and is included as part of a first document object model of a digital document;
   generating in response to the edit to the digital content specified by the user input by the at least one computing device, a second document object model in which the edit specified by the user input is used to change the first document object model into the second document object model, the second document object model is separate from the first document object model;
   comparing, by the at least one computing device, the first document object model with the second document object model;
   determining, by the at least one computing device, a difference between the first object model and the second document object model responsive to the comparing;
   identifying, by the at least one computing device, at least one content editing operation configured to transform the first document object model into the second document object model based on the determined difference between the first document object model and the second document object model; and
   transmitting, by the at least one computing device, the identified at least one content editing operation for receipt by a client device to update the digital document by applying the identified at least one content editing operation to the first document object model, the transmitting including the identified at least one content editing operation and not including the second document object model.

2. The method as described in claim 1, wherein the user input is received via a user interface as directing editing a markup of the first document object model.

3. The method as described in claim 1, wherein the generating of the second document object model specified by the edit includes replacing the digital content specified by the node in the first document object model.

4. The method as described in claim 1, wherein the identified at least one content editing operation includes editing a DOM node type, editing an attribute, removing an attribute, inserting a node, deleting a node, or editing digital content.

5. The method as described in claim 1, further comprising indicating, via a user interface, nodes of the updated digital document as corresponding to the identified at least one content editing operation.

6. The method as described in claim 1, wherein the edit to the first document object model of the digital document includes editing a DOM node type of a node included in the first document object model, editing an attribute of a node included in the first document object model, or removing an attribute of a node included in the first document object model.

7. The method as described in claim 1, wherein the transmitting is further configured to cause the client device to hide digital content of the digital document associated with the identified at least one content editing operation and not hide digital content of the digital document that is not updated by the identified at least one content editing operation.

8. The method as described in claim 7, wherein the receiving, the generating, the identifying, and the transmitting are performed at runtime of the digital document.

9. The method as described in claim 1, wherein the user input is received via a user interface as part of what you see is what you get (WYSIWYG) editing of portions of the digital document in real time during runtime of the digital document.

10. The method as described in claim 1, wherein the first and second document object models are implemented using a markup language.

11. In a digital medium digital document editing environment, a system comprising:
    a processing system; and
    a computer-readable storage medium having instructions stored thereon that, responsive to execution by the processing system, causes the processing system to perform operations including:
       receiving a user input specifying an edit to digital content or a structure of a first document object model of a digital document, the digital content is specified by a node and is included as part of the first document object model of the digital document;

generating, in response to receiving the edit specified by the user input, a second document object model in which the user input is used to change the first document object model into the second document object model, the second document object model is separate from the first document object model;

comparing the first document object model with the second document object model;

determining a difference between the first object model and the second document object model responsive to the comparing;

identifying at least one content editing operation to transform the first document object model into the second document object model based on the determined different between the first document object model and the second document object model; and transmitting the at least one content editing operation for receipt by a client device to update the digital document by applying the at least one content editing operation to the first document object model, the transmitting includes the at least one content editing operation and does not include the second document object model.

12. The system as described in claim 11, wherein the generating operation includes modifying a tag name, attribute name, attribute value, or digital content of the first document object model.

13. The system as described in claim 11, wherein the at least one content editing operation includes editing a DOM node type, editing an attribute, removing an attribute, inserting a node, deleting a node, or editing digital content.

14. The system as described in claim 11, wherein the transmitting operation is configured to cause the client device to hide digital content of the digital document as it is updated by the at least one content editing operations and not hide digital content of the digital document that is not updated by the at least one content editing operation.

15. The system as described in claim 11, wherein the receiving, the generating, the identifying, and the transmitting operations are performed at runtime of the digital document.

16. In a digital medium digital document editing environment, a method implemented by at least one computing device, the method comprising:

receiving, by the at least one computing device, a user input specifying an edit to a structure of a first document object model of a digital document involving adding a node to the first document object model;

generating, in response to the edit specified by the user input involving adding the node to the first document object model by the at least one computing device, a second document object model in which the edit specified by the user input is used to change the structure of the first document object model into the second document object model, the second document object model is separate from the first document object model;

comparing, by the at least one computing device, the first document object model with the second document object model;

determining, by the at least one computing device, a difference between the first object model and the second document object model responsive to the comparing;

identifying, by the at least one computing device, at least one content editing operation configured to transform the first document object model into the second document object model based on the determined difference between the first document object model and the second document object model; and transmitting, by the at least one computing device, the identified at least one content editing operation for receipt by a client device to update the digital document by applying the identified at least one content editing operation to the first document object model, the transmitting includes the identified at least one content editing operation and does not include the second document object model.

17. The method as described in claim 16, wherein the edit further includes digital content of the first document object model.

18. The method as described in claim 16, wherein the at least one content editing operation further includes editing a DOM node type, editing an attribute, removing an attribute, inserting a node, deleting a node, or editing digital content.

19. The method as described in claim 16, wherein the transmitting is further configured to cause the client device to hide digital content of the digital document associated with the identified at least one content editing operation and not hide digital content of the digital document that is not updated by the identified at least one content editing operation.

20. The method as described in claim 19, wherein the receiving, the generating, the identifying, and the transmitting are performed at runtime of the digital document.

* * * * *